United States Patent [19]
Ngoc et al.

[11] Patent Number: 5,674,933
[45] Date of Patent: Oct. 7, 1997

[54] LOW FOGGING RUBBERY POLYMER

[75] Inventors: Hung Dang Ngoc, Limeil Brevannes; Mariano Salazar, Orsay, both of France

[73] Assignee: The Goodyear Tire & Rubber Company, Akron, Ohio

[21] Appl. No.: 573,983

[22] Filed: Dec. 18, 1995

Related U.S. Application Data

[60] Continuation-in-part of Ser. No. 440,032, May 12, 1995, Pat. No. 5,504,160, which is a division of Ser. No. 306,291, Sep. 15, 1994, Pat. No. 5,415,940, which is a division of Ser. No. 43,076, Apr. 5, 1993, Pat. No. 5,380,785.

[51] Int. Cl.$^6$ .................................................. C08L 55/02
[52] U.S. Cl. .................... 524/504; 524/511; 524/521; 524/522; 524/160; 524/162
[58] Field of Search ................................ 524/504, 511, 524/521, 522, 160, 162

[56] References Cited

U.S. PATENT DOCUMENTS 5,380,785  1/1995  Ngoc et al. .................... 524/504

FOREIGN PATENT DOCUMENTS 1599397  10/1990  U.S.S.R. .

*Primary Examiner*—Mark Nagumo
*Attorney, Agent, or Firm*—Alvin T. Rockhill

[57] ABSTRACT

There is a need for polymers which offer increased heat resistance, ultraviolet light resistance, and low fogging characteristics for utilization in automotive interiors. It is particularly critical for polymers which are utilized in making skin compounds for automotive instrument and door panels to display excellent heat resistance, ultraviolet light resistance, and low fogging characteristics. This invention more specifically discloses a rubbery polymer which can be blended with polyvinyl chloride to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) acrylonitrile, (d) styrene, (e) a surfactant selected from the group consisting of sulfonates and sulfate derivatives, (f) a dispersant selected from the group consisting of aromatic formaldehyde condensation products and polycarboxylates, and (g) a crosslinking agent.

14 Claims, No Drawings

LOW FOGGING RUBBERY POLYMER

This is a continuation-in-part of Ser. No. 08/440,032, filed on May 12, 1995, now U.S. Pat. No. 5,504,160, which was a divisional of Ser. No. 08/306,291, filed on Sep. 15, 1994, now issued as U.S. Pat. No. 5,415,940, which was a divisional of Ser. No. 08/043,076, filed on Apr. 5, 1993, now issued as U.S. Pat. No. 5,380,785.

BACKGROUND OF THE INVENTION

Automotive instrument panels and door panels are typically composites which are made of a rigid backing which supports a semi-rigid urethane foam with the semi-rigid urethane foam being covered with a skin compound. Such skin compounds are typically blends of polyvinyl chloride (PVC) with a nitrile rubber (NBR). The nitrile rubber is included in such blends as a permanent modifier for the PVC which provides it with a higher degree of flexibility.

The automotive industry is currently moving toward more aerodynamic body designs which typically include larger glass areas. Such design changes have significantly increased the heat and ultraviolet light aging requirements of automotive interiors. This has in turn significantly increased the demands put upon the polymers which are utilized as skins in automotive interior panels.

Heat and light stabilizers can be employed to improve the heat and ultraviolet light aging characteristics of conventional PVC/NBR blends which are utilized as skins for automotive interior panels. However, the degree to which the aging characteristics of such blends can be improved by the addition of additives is limited. In fact, there is a demand for performance characteristics in such applications which heretofore has not been realized by the utilization of heat and light stabilizers. For instance, it would be highly desirable for the skins used in automotive panels to resist discoloration and cracking under conditions of high heat and intense ultraviolet light throughout the life of the vehicle. Improved fogging behavior is also of great importance to the automotive industry. Fogging is caused by the condensation of volatile compounds with vaporize from the interior panel onto the windscreen or side windows of the vehicle.

NBR/PVC blends offer an array of physical properties which make them useful as a skin composition for automotive panels. The NBR acts as a permanent flexibilizing monomer for the PVC. It also acts as a shrinkage control agent, and embossing aid, and improves grain retention. The NBR in such blends further provides vacuum forming gauge control and exhibits low fog characteristics. NBR is highly compatible with PVC and has the capability of being recycled. It is essential for any polymer which is substituted for NBR to display these essential characteristics.

SUMMARY OF THE INVENTION

The present invention relates to a rubbery polymer which can be blended with PVC to make leathery compositions. These compositions are particularly useful in manufacturing skins for automotive interior panelling. Skin compositions which are made utilizing this rubbery polymer provide a higher level of resistance to heat and ultraviolet light than those made utilizing conventional NBR/PVC blends. The rubbery polymers of this invention also offer low fog characteristics, low odor, shrinkage control, and grain retention. They also act as an embossing aid and as a permanent flexibilizing modifier. The rubbery polymers of this invention also have characteristics which make them useful in building gasket applications.

This invention more specifically discloses a rubbery polymer which can be blended with polyvinyl chloride to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) acrylonitrile, (d) styrene, (e) a surfactant selected from the group consisting of sulfonates and sulfate derivatives, (f) a dispersant selected from the group consisting of aromatic formaldehyde condensation products and polycarboxylates, and (g) a crosslinking agent.

The present invention reveals a process for preparing a rubbery polymer which can be blended with polyvinyl chloride to make leathery compositions having good heat and ultraviolet light resistance, said process comprising the steps of (1) polymerizing (a) butyl acrylate, (b) at least one member selected from the group consisting of methyl methacrylate, ethyl methacrylate, methyl acrylate, and ethyl acrylate, (c) acrylonitrile, (d) a crosslinking agent, and (e) a surfactant selected form the group consisting of sulfonates and sulfate derivatives, and (f) a dispersant selected from the group consisting of aromatic formaldehyde condensation products and polycarboxylates, under emulsion polymerization conditions to produce a seed polymer containing latex; (2) adding (a) styrene, (b) additional acrylonitrile, and (c) additional crosslinking agent to the seed polymer containing latex under emulsion polymerization conditions which result in the formation of an emulsion containing the rubbery polymer; and (3) recovering the rubbery polymer from the emulsion containing the rubbery polymer.

The subject invention further reveals a process for preparing a rubbery polymer which can be blended with polyvinyl chloride to make leathery compositions having good heat and ultraviolet light resistance, said process comprising the steps of (1) polymerizing (a) butyl acrylate, (b) at least one member selected from the group consisting of methyl methacrylate, ethyl methacrylate, methyl acrylate, and ethyl acrylate, (c) acrylonitrile, (d) a crosslinking agent, (e) a surfactant selected form the group consisting of sulfonates and sulfate derivatives, and (f) a dispersant selected from the group consisting of aromatic formaldehyde condensation products and polycarboxylates, under emulsion polymerization conditions to produce a seed polymer containing latex; (2) adding (a) styrene, (b) additional acrylonitrile, and (c) additional crosslinking agent to the seed polymer containing latex under emulsion polymerization conditions which result in the formation of an emulsion containing the rubbery polymer; (3) adding an aminoalcohol to the emulsion containing the rubbery polymer; and (4) recovering the rubbery polymer from the emulsion containing the rubbery polymer.

The present invention also discloses a leathery composition which is useful in automotive applications which is comprised of (1) polyvinyl chloride, (2) a plasticizer, and (3) a rubbery polymer which is comprised of repeat units which are comprised of (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) acrylonitrile, (d) styrene, (e) a surfactant selected form the group consisting of sulfonates and sulfate derivatives, (f) a dispersant selected from the group consisting of aromatic formaldehyde condensation products and polycarboxylates, and (g) a crosslinking agent.

The subject invention further reveals a panel for automotive applications which is comprised of a semirigid urethane foam which is supported by a rigid backing, wherein said semirigid urethane foam is covered with a leathery skin which is comprised of (1) polyvinyl chloride, (2) a plasticizer, and (3) a rubbery polymer which is comprised of repeat units which are comprised of (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) acrylonitrile, (d) styrene, (e) a surfactant selected form the group consisting of sulfonates and sulfate derivatives, (f) a dispersant selected from the group consisting of aromatic formaldehyde condensation products and polycarboxylates, and (g) a crosslinking agent.

DETAILED DESCRIPTION OF THE INVENTION

The rubbery polymers of this invention are synthesized utilizing a free radical emulsion polymerization technique. These rubbery polymers are comprised of repeat units which are derived from (a) butyl acrylate, or optionally a mixture of butyl acrylate and 2-ethylhexyl acrylate containing up to about 40% 2-ethylhexyl acrylate, (b) methyl methacrylate, ethyl methacrylate, methyl acrylate, or ethyl acrylate, (c) acrylonitrile, (d) styrene, (e) a surfactant selected form the group consisting of sulfonates and sulfate derivatives, (f) a dispersant selected from the group consisting of aromatic formaldehyde condensation products and polycarboxylates, and (g) a crosslinking agent. The crosslinking agent is typically a multi-functional acrylate, a multi-functional methacrylate or divinylbenzene. Some specific examples of crosslinking agents which can be used include ethylene glycol methacrylate, divinylbenzene, and 1,4-butanediol dimethacrylate.

Technically, the rubbery polymers of this invention contain repeat units (chain linkages) which are derived from (a) butyl acrylate, or optionally a mixture of butyl acrylate and 2-ethylhexyl acrylate containing up to about 40% 2-ethylhexyl acrylate, (b) methyl methacrylate, ethyl methacrylate, methyl acrylate, or ethyl acrylate, (c) acrylonitrile, (d) styrene, (e) a surfactant selected form the group consisting of sulfonates and sulfate derivatives, (f) a dispersant selected from the group consisting of aromatic formaldehyde condensation products and polycarboxylates, and (g) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers in actuality means that it contains repeat units which are derived from those monomers.

The rubbery polymers of this invention will normally contain (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 5 weight percent to about 35 weight percent methyl methacrylate, ethyl methacrylate, methyl acrylate, or ethyl acrylate, (c) from about 4 weight percent to about 30 weight percent acrylonitrile, (d) from about 3 weight percent to about 25 weight percent styrene, (e) from about 0.1 weight percent to about 6 weight percent of a surfactant selected form the group consisting of sulfonates and sulfate derivatives, (f) from about 0.1 weight percent to about 6 weight percent of a dispersant selected from the group consisting of aromatic formaldehyde condensation products and polycarboxylates, and (g) from about 0.25 weight percent to about 8 weight percent of a crosslinking agent.

Such rubbery polymers will preferably contain (a) from about 50 weight percent to about 80 weight percent butyl acrylate, or optionally a mixture of butyl acrylate and 2-ethylhexyl acrylate containing up to about 40% 2-ethylhexyl acrylate, (b) from about 3 weight percent to about 25 weight percent of at least one member selected from the group consisting of methyl methacrylate, ethyl methacrylate, methyl acrylate, and ethyl acrylate, (c) from about 6 weight percent to about 30 weight percent acrylonitrile, (d) from about 5 weight percent to about 18 weight percent styrene, (e) from about 0.3 weight percent to about 5 weight percent of a surfactant selected form the group consisting of sulfonates and sulfate derivatives, (f) from about 0.3 weight percent to about 5 weight percent of a dispersant selected from the group consisting of aromatic formaldehyde condensation products and polycarboxylates, and (g) from about 0.5 weight percent to about 4 weight percent of a crosslinking agent.

The rubbery polymers of this invention will more preferably be comprised of repeat units which are derived from (a) from about 55 weight percent to about 75 weight percent butyl acrylate, or optionally a mixture of butyl acrylate and 2-ethylhexyl acrylate containing up to about 40% 2-ethylhexyl acrylate, (b) from about 5 weight percent to about 20 weight percent of at least one member selected from the group consisting of methyl methacrylate, ethyl methacrylate, methyl acrylate, and ethyl acrylate, (c) from about 10 weight percent to about 25 weight percent acrylonitrile, (d) from about 8 weight percent to about 14 weight percent styrene, (e) from about 0.5 weight percent to about 4 weight percent of a surfactant selected form the group consisting of sulfonates and sulfate derivatives, (f) from about 0.5 weight percent to about 4 weight percent of a dispersant selected from the group consisting of aromatic formaldehyde condensation products and polycarboxylates, and (g) from about 1 weight percent to about 3 weight percent of a crosslinking agent. The percentages reported in this paragraph are based upon the total weight of the rubbery polymer.

The rubbery polymers of the present invention are synthesized in an aqueous reaction mixture by utilizing a free radical polymerization technique. The reaction mixture utilized in this polymerization technique is comprised of water, the appropriate monomers, a suitable free radical initiator, a crosslinking agent, a surfactant selected form the group consisting of sulfonates and sulfate derivatives, and a dispersant selected from the group consisting of aromatic formaldehyde condensation products and polycarboxylates. The reaction mixture utilized in this polymerization technique will normally contain from about 10 weight percent to about 80 weight percent monomers, based upon the total weight of the reaction mixture. The reaction mixture will preferably contain from about 20 weight percent to about 70 weight percent monomers and will more preferably contain from about 40 weight percent to about 50 weight percent monomers.

The reaction mixtures utilized in carrying out such polymerizations will typically contain from about 0.1 phm (parts per hundred parts of monomer by weight) to about 5 phm of at least one member selected from the group consisting of metal salts of alkyl sulfates and metal salts of alkyl sulfonates, and from about 0.1 phm to about 5 phm of at least one dispersant selected from the group consisting of aromatic formaldehyde condensation products and polycarboxylates. It is generally preferred for the reaction mixture to contain from about 0.25 phm to about 4.25 phm of the metal salt of the alkyl sulfonate or the metal salt of the alkyl sulfate and from about 0.25 phm to about 4.25 phm of the dispersant selected from the group consisting of aromatic formaldehyde condensation products and polycarboxylates. It is normally more preferred for the reaction mixture to contain from about 0.4 phm to about 3.5 phm of the metal salt of the alkyl sulfonate or the metal salt of the alkyl sulfate, and from about 0.4 phm to about 3.5 phm of the dispersant selected from the group consisting of aromatic formaldehyde condensation products and polycarboxylates.

The free radical polymerization technique utilized in this synthesis is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like, the various alkyl perketals, such as 2,2-bis-(t-butylperoxy)butane, and the like. Water soluble peroxygen free radical initiators are especially useful in such aqueous polymerizations.

The emulsion polymerizations of this invention are typically carried out at the temperature ranging between about 60° F. (20° C.) and 190° F. (88° C.). At temperatures above about 88° C. alkyl acrylate monomers, such as butyl acrylate, have a tendency to boil. Thus, a pressurized jacket would be required for heating such alkyl acrylate monomers to temperatures in excess of about 88° C. On the other hand, at polymerization temperatures of less than about 55° C. a redox initiator system is required to insure satisfactory polymerization rates.

The sulfonates and sulfate derivatives that are useful in this invention as surfactants are commercially available from a wide variety of sources. For instance, Du Pont sells sodium alkylarylsulfonate under the tradename Alkanol™, Browning Chemical Corporation sells sodium dodecylbenzene sulfonates under the tradename Ufaryl™ Dl-85, and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate, and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

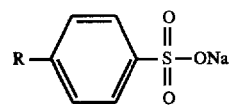

wherein R represents an alkyl group containing from 1 to about 20 carbon atoms. It is preferred for the alkyl group to contain from about 8 to about 14 carbon atoms.

The sulfonate surfactant can be a mixture of (mono) dialkylate ether disulfonates. The advantage of the disulfonate structure is that it contains two ionic charges per molecule instead of one as is the case with conventional alkyl sulfonate surfactants. Mixtures of (mono)dialkylate ether disulfates which are useful in the practice of this invention are commercially available from a wide variety of sources. For instance Dow Chemical sells Dowfax™ alkylated disulfonated diphenyl oxides which are of the structural formula:

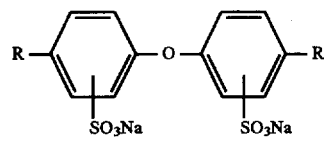

wherein R is an alkyl group which is typically —$C_6H_{13}$, —$C_{10}H_{21}$, —$C_{12}H_{25}$, or —$C_{16}H_{33}$. Sodium mono and di dodecyldiphenyloxide disulfonates are sold by American Cyanamid as DPOS-45 surfactants. Alpha-olefin sulfonate surfactants which are suitable for utilization in this invention are commercially available from Witco and Hoechst AG.

The sulfate surfactants which are useful in the practice of this invention include metal salts of alkylsulfates having the structural formula $ROSO_3X$ and metal salts of alkylethersulfates having the structural formula $RO(CH_2CH_2O)_n SO_3X$, wherein X represents a group Ia metal, such as sodium or potassium. Sodium lauryl sulfate, sodium ethanolamine lauryl sulfate, and triethanolamine lauryl sulfate are representative examples of commercially available sulfate surfactants.

The dispersant utilized in the polymerizations of this invention are normally either aromatic formaldehyde condensation products or polycarboxylates. The aromatic formaldehyde condensation products are normally polysulfonates which are the reaction product of aromatic compounds and formaldehyde. Such aromatic formaldehyde condensation product soaps can be made by a relatively simple process. For example, in such a process 200 parts of naphthalene is reacted with 200 parts of 98% sulfuric acid for 5 hours at a temperature of about 165°. The solution made is then subsequently cooled and diluted with 90 parts of water. Then 107 parts of a 30% formaldehyde solution is added and the mixture is stirred for 20 hours at a temperature of about 80° C. Toward the end of this reaction period the mixture is gradually heated to 100° C. Neutralization is subsequently carried out at 20° C. to 25° C. with about 165 to 180 parts of a 25% ammonia solution. The neutralization product is then filtered and, if necessary, dried in a vacuum drier.

Numerous variations of this synthesis are possible, and a wide range of aromatic compounds and their derivatives can react with aldehydes, ketones, and compounds that eliminate aldehyde groups. For example, (a) dispersants produced by condensation of aromatic sulfonic acids and benzyl chloride or benzoin; (b) dispersants produced by condensation of various alkylarylsulfonic acids with a halogen arylsulfonic acid; and (c) dispersants produced by condensation of sulfonated phenols or 2-naphthols with formaldehyde and various nitrogen compounds.

Some representative examples of aromatic formaldehyde condensation products are shown below:

| Production Constituents | Structural Units |
|---|---|
| Naphthalene + $H_2SO_4$ + formaldehyde | naphthalene-$CH_2$ unit with $SO_3Na$ |
| Naphthalene + cresol + $H_2SO_4$ + formaldehyde | naphthalene-$CH_2$-cresol-$CH$ unit with $SO_3Na$, OH, $CH_3$ |
| Diphenyl ether + $H_2SO_4$ + formaldehyde | diphenyl ether-$CH_2$ unit with $SO_3Na$ |
| Toluene + $H_2SO_4$ + formaldehyde | toluene-$CH_2$ unit with $CH_3$, $SO_3Na$ |
| Isopropylbenzene + $H_2SO_4$ + formaldehyde | isopropylbenzene-$CH_2$ unit with $H_3C-CH-CH_3$, $SO_3Na$ |
| Cresol + $H_2SO_4$ + formaldehyde | cresol-$CH_2$ unit with OH, $H_3C$, $SO_3Na$ |
| Phenol + formaldehyde + sodium sulfite | phenol-$CH_2$-phenol and phenol-$CH_2OCH_2$-phenol units with OH, $CH_2SO_3Na$ |
| Cyclohexanone + formaldehyde + sodium sulfite | cyclohexanone-$CH_2$-cyclohexanone unit with $CH_2SO_3Na$ |

-continued

| Production Constituents | Structural Units |
|---|---|
| Phenol + H$_2$SO$_4$ + formaldehyde | $\left[\begin{array}{c} \text{OH} \\ \text{CH}_2 \\ \text{SO}_3\text{Na} \end{array}\right]_x$ (phenol ring with OH, CH$_2$, and SO$_3$Na substituents) |

The carboxylate is also a water soluble polymeric dispersing agent. For instance, methacrylic acid can be polymerized to yield water soluble homopolymer which can be employed as a carboxylate dispersant. Copolymers with maleic acid, acrylic acid-maleic acid, maleic acid-methylvinyl ether, and diisobutylene-maleic acid (DIBMA) are also very useful in the practice of this invention. Carboxylate dispersants are commercially available from a variety of sources.

The free radical emulsion polymerization utilized in synthesizing the rubbery polymers of this invention are typically conducted at a temperature which is within the range of about 10° C. to about 95° C. In most cases, the polymerization temperature utilized will vary between about 20° C. and about 80° C. The polymerization is carried out as a two step batch process. In the first step, a seed polymer containing latex is synthesized. This is done by polymerizing (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) acrylonitrile, and (d) a crosslinking agent.

The seed polymer containing latex is typically prepared by the polymerization of a monomer mixture which contains about 40 to about 90 weight percent butyl acrylate, or optionally a mixture of butyl acrylate and 2-ethylhexyl acrylate containing up to about 40% 2-ethylhexyl acrylate, from about 5 to about 35 weight percent methyl methacrylate, ethyl methacrylate, methyl acrylate, or ethyl acrylate, from about 2 to about 30 weight percent acrylonitrile, and from about 0.25 weight percent to 6 weight percent of the crosslinking agent. It is typically preferred for the monomeric component utilized in the first step to include about 50 weight percent to about 85 weight percent butyl acrylate, or optionally a mixture of butyl acrylate and 2-ethylhexyl acrylate containing up to about 40% 2-ethylhexyl acrylate, from about 5 weight percent to about 30 weight percent ethyl acrylate, ethyl methacrylate, methyl acrylate, or methyl methacrylate, from about 4 weight percent to about 28 weight percent acrylonitrile, and from about 0.5 weight percent to about 4 weight percent of the crosslinking agent. It is generally more preferred for the monomer charge composition used in synthesizing the seed polymer latex to contain from about 60 weight percent to about 80 weight percent butyl acrylate, or optionally a mixture of butyl acrylate and 2-ethylhexyl acrylate containing up to about 40% 2-ethylhexyl acrylate, from about 5 weight percent to about 25 weight percent methyl methacrylate, ethyl methacrylate, methyl acrylate, or ethyl acrylate, from about 5 weight percent to about 25 weight percent acrylonitrile, and from about 1 to about 3 weight percent crosslinking agent.

After the seed polymer latex has been prepared, styrene monomer, additional acrylonitrile monomer, and additional crosslinking agent is added to the seed polymer containing latex. As a general rule, from about 4 parts by weight to about 30 parts by weight of styrene, from about 1 part by weight to about 20 parts by weight of additional acrylonitrile, and from about 0.01 to 2 parts by weight of the crosslinking agent will be added. In this second stage of the polymerization, it is preferred to add from about 6 parts by weight to about 22 parts by weight of styrene, from about 3 parts by weight to about 12 parts by weight of acrylonitrile, and from about 0.05 parts by weight to 1 part by weight of the crosslinking agent. It is typically more preferred for from about 10 parts by weight to about 17 parts by weight of styrene, from about 4 parts by weight to about 8 parts by weight of acrylonitrile, and from about 0.1 parts by weight to about 0.5 parts by weight of the crosslinking agent to be added to the seed polymer latex to initiate the second phase of the polymerization.

A wide variety of crosslinking agents can be utilized in carrying out the polymerizations of this invention. Some representative examples of crosslinking agents which can be utilized include difunctional acrylates, difunctional methacrylates, trifunctional acrylates, trifunctional methacrylates, and divinylbenzene. 1,4-butanediol dimethacrylate has proven to be particularly useful as the crosslinking agent.

In most cases, the polymerization will be continued until a high monomer conversion has been attained. After the polymerization has been completed it is normally desirable to add an aminoalcohol to the emulsion to deodorize the latex. The aminoalcohol will generally be of the structural formula HO—A—NH$_2$ wherein A represents an alkylene group which contains from 2 to about 20 carbon atoms. It is normally preferred for the aminoalcohol to contain from 2 to about 10 carbon atoms with amino alcohols which contain from 2 to about 5 carbon atoms being most preferred. Ethanolamine (HO—CH$_2$—CH$_2$—NH$_2$) which is also known as 2-aminoethanol and 2-hydroxyethylamine is a representative example of a highly preferred aminoalcohol. Some additional examples of preferred aminoalcohols include 3-aminopropanol, 4-aminobutanol, 2-amino-2-methyl-1-propanol, 2-amino-2-ethyl-1,3-propanediol, N-methyl-2,2-iminoethanol and 5-aminopentanol.

This deodorizing step will be carried out under conditions which allow for the aminoalcohol to react with residual n-butylacrylate and acrylonitrile which is present in the emulsion. This reaction will proceed over a broad temperature range and the deodorizing step can be conducted at any temperature which is within the range of about 5° C. and about 95° C. However for practical reasons the deodorizing step will normally be carried out at a temperature which is within the range of about 20° C. to about 70° C. Since the reaction is faster at higher temperatures the amount of reaction time needed will decrease with increasing temperature. For instance, at a temperature of about 20° C. a residence time in the deodorizing step of one to three days may be required. On the other hand, at a temperature of about 65° C. only about two hours of reaction time is normally required.

The amount of time required for the aminoalcohol to react with the residual n-butylacrylate monomer and residual acrylonitrile monomer will also depend upon the level of aminoalcohol utilized. As a general rule from about 0.05 weight percent to about 2 weight percent of the aminoalcohol will be added, based upon the total weight of the emulsion. More typically from about 0.1 weight percent to about 1.5 weight percent of the aminoalcohol will be added. It is normally preferred to utilize from about 0.3 weight percent to about 1 weight percent of the aminoalcohol.

The rubbery polymer made by the two step batch polymerization process is recovered from the emulsion (latex) after the optional deodorizing step. This can be accomplished by utilizing standard coagulation techniques. For instance, coagulation can be accomplished by the addition of salts, acids, or both to the latex.

After the rubbery polymer is recovered by coagulation it can be washed to further reduce odors. This can be accomplished by simply pouring or spraying water on the rubbery polymer. The rubbery polymer can also be washed by putting it in a water bath which will further reduce odor. After being washed the rubbery polymer is generally dried.

It is sometimes advantageous to convert the dry rubbery polymer into a powder to facilitate its usage. In this case, it will be beneficial to add a partitioning agent to the rubbery polymer. Some representative examples of partitioning agents which can be employed include calcium carbonate, emulsion polyvinyl chloride, and silica. Calcium carbonate is a highly desirable partitioning agent which can be utilized in such applications.

The rubbery polymers of this invention can be blended with polyvinylchloride to make leather like compositions. These leathery compositions offer an excellent combination of properties for utilization in making skin compounds for panels used in automotive applications. These leathery compositions can be prepared by blending the rubbery polymer into polyvinylchloride (PVC) utilizing standard mixing techniques. It is highly preferred for the rubbery polymer to be in powdered form when blended into PVC to make such leathery compositions.

A wide variety of plasticizers which are compatible with the polyvinyl chloride resins can be employed. Some representative examples of plasticizers which are highly suitable for this application include abietic derivatives, such as hydroabietyl alcohol, methyl abietate and hydrogenated methyl abietate; acetic acid derivatives, such as cumylphenyl acetate; adipic acid derivatives, such as benzyloctyl adipate, dibutyl adipate, diisobutyl adipate, di-(2-ethylhexyl) adipate, diisononyl adipate, diisooctyl adipate, dinonyl adipate, $C_{7-9}$ linear adipate, dicapryl adipate, octyl decyl adipate (n-octyl, n-decyl adipate), straight chain alcohol adipate, didecyl adipate (diisodecyl adipate), dibutoxyethyl adipate, high molecular weight adipate, polypropylene adipate, modified polypropylene adipate; azelaic acid derivatives, such as dicyclohexyl azelate, di-(2-ethylhexyl) azelate, di-n-hexyl azelate, low temperature plasticizer, diisooctyl azelate; benzoic acid derivatives such as diethylene glycol dibenzoate, dipropylene glycol dibenzoate, diethylene glycol benzoate and dipropylene glycol benzoate blend, proprietary low stain neopentyl glycol dibenzoate, glyceryl tribenzoate, trimethylolethane tribenzoate, pentaerythritol tribenzoate, cumylphenyl benzoate; polyphenyl derivatives such as hydrogenated terphenyl; citric acid derivatives, such as triethyl citrate, tri-n-butyl citrate, acetyl triethyl citrate, acetyl tri-n-butyl citrate, acetal tributyl citrate; epoxy derivatives such as butyl epoxy stearate, epoxy-type plasticizer, epoxy-type plasticizer tallate, alkyl epoxy stearate, epoxidized butyl ester, epoxidized octyl tallage, epoxidized soybean oil, epoxidized triglyceride, epoxidized soya bean oil, epoxidized sunflower oil, epoxidized-type plasticizer, epoxidized linseed oil, epoxidized tallate ester, 2-ethylhexyl-epoxy tallate, octyl epoxy stearate; proprietary esters such as proprietary ester and mixed ester; ether derivatives, such as cumylphenyl benzyl ether; formal derivatives such as butyl carbitol formal; fumaric acid derivatives, such as dibutyl fumarate, diisooctyl fumarate, dioctyl fumarate; glutaric acid derivatives such as mixed dialkyl glutarates and dicumylphenyl glutarate; glycol derivatives such as diethylene glycol dipelargonate, triethylene glycol dipelargonate, triethylene glycol di-(2-ethylbutyrate), triethylene glycol di-caprylate, triethylene glycol di-(2-ethylhexoate), triethylene glycol dicaprylate, tetraethylene glycol dicaprylate, polyethylene glycol di-(2-ethylhexoate), butyl phthalyl butyl glycolate, triglycolester of vegetable oil fatty acid, triethylene glycol ester of fatty acid; linear dibasic acid derivatives such as mixed dibasic ester; petroleum derivatives such as aromatic hydrocarbons; isobutyric acid derivatives such as 2,2,4-trimethyl-1,3-pentanediol diisobutyrate; isophthalic acid derivatives such as di(2-ethylhexyl) isophthalate, diisooctyl isophthalate, dioctylisophthalate; lauric acid derivatives such as butyllaurate, 1,2-propylene glycol monolaurate, ethylene glycol monoethyl ether laurate, ethylene glycol monobutyl ether laurate, glycerol monolaurate, polyethylene glycol-400-dilaurate; mellitates such as n-octyl, n-decyl trimellitate, tri-n-octyl-n-decyl trimellitate, triisononyl trimellitate, triisooctyl trimellitate, tricapryl trimellitate, diisooctyl monoisodecyl trimellitate, triisodecyl trimellitate, tri($C_{7-9}$ alkyl) trimellitate, tri-2-ethylhexyl trimellitate; nitrile derivatives such as fatty acid nitrile; oleic acid derivatives such as butyl oleate, 1,2-propylene glycol mono oleate, ethylene glycol monobutyl ether oleate, tetrahydrofurfuryl oleate, glyceryl monoleate; paraffin derivatives such as chlorinated paraffins, diethylene glycol dipelargonate, triethylene glycol dipelargonate, 2-butoxyethyl dipelargonate; phenoxy plasticizers such as acetyl paracumyl phenol; phosphoric acid derivatives such as tri-(2-ethylhexyl) phosphate, tributoxyethyl phosphate, triphenyl phosphate, cresyl diphenyl phosphate, tricresyl phosphate, triisopropylphenyl phosphate, alkyl aryl phosphates, diphenylxylenyl phosphate, phenyl isopropylphenyl phosphate; phthalic acid derivatives such as alkyl benzene phthalates, dimethyl phthalate, dibutyl phthalate, diisobutyl phthalate, dihexyl phthalate, butyl octyl phthalate, butyl isodecyl phthalate, butyl iso-hexyl phthalate, diisononyl phthalate, dioctyl phthalate, di-(2-ethyl hexyl) phthalate, n-octyl-n-decyl phthalate, hexyl octyl decyl phthalate, didecyl phthalate diisodecyl phthalate, diisodecyl phthalate, diundecyl phthalate, butyl-ethylhexyl phthalate, butylbenzyl phthalate, octylbenzyl phthalate, dicyclohexyl phthalate, diphenyl phthalate, alkylaryl phthalates and 2-ethylhexylisodecyl phthalate; ricinoleic acid derivatives such as methylacetyl ricinoleate, n-butyl acetyl ricinoleate, glyceryl triacetyl ricinoleate; sebacic acid derivatives such as dimethyl sebacate, dibutyl sebacate, and dibutoxyethyl sebacate; stearic acid derivatives such as glyceryl tri-acetoxy stearate, butyl acetoxy stearate, methylpentachlorostearate, and methoxylethyl acetoxy stearate; sucrose derivatives such as sucrose benzoate; sulfonic acid derivatives such as alkyl-sulfonic esters of phenol; tall oil derivatives such as methylester of tall oil and isooctyl ester of tall oil; and terephthalic acid derivatives such as dioctyl terephthalate. However, it obtain a low fogging IP skin the plasticizers selected should be subjected to fogging testing before use to insure that their utilization does not lead to fog formation.

Such leathery compositions typically contain from about 40 to 160 parts by weight of the rubbery polymer, from about 10 to about 50 parts of a plasticizer, and from about 0.1 to about 5 parts by weight of an antidegradant per 100 parts by weight of the polyvinylchloride. It is typically preferred for such leathery compositions to contain from about 60 to about 120 parts by weight of the rubbery polymer, from about 15 to about 40 parts of the plasticizer, and from about 0.5 to 3 parts of an antidegradant (per 100 parts of the PVC). It is typically more preferred for the leathery composition to contain from about 70 to about 90 parts by weight of the rubbery polymer, from about 20 to about 30 parts by weight of the plasticizer, and from about 1 to 2 parts by weight of the antidegradant per 100 parts by weight of the PVC.

Such compositions will also generally contain an acrylonitrile-butadiene-styrene resin (ABS resin). The leathery composition will typically contain from about 15 parts to about 80 parts of ABS resin per 100 parts of PVC. The leathery composition will preferably contain from about 25 to about 55 parts per weight of the ABS resin per 100 parts by weight of the PVC. It is generally more preferred for the leathery composition to contain from about 30 to about 40 parts by weight of the ABS resin per 100 parts by weight of PVC. Various colorants and/or pigments will typically also be added to the composition to attain a desired color.

The leathery compositions of this invention are useful in a wide variety of applications. For example, they have been found to be extremely valuable when used in making skins for automotive panels. Such panels are typically comprised of a semi-rigid urethane foam which is supported by a rigid backing and covered with the leathery composition of this invention. Such skins are made by calendering the leathery compositions of this invention and then cutting them to the desired size and shape. Such skins for automotive applications which are made with the leathery compositions of this invention offer outstanding heat resistance, ultraviolet light stability, and low fogging characteristics. These are highly desirable characteristics which can help to prevent the skin of automotive panels from cracking during the normal life of the vehicle.

The rubbery polymers of this invention can also be blended with other halogen containing polymers (in addition to PVC), styrenic polymers (polymers which contain styrene, such as acrylonitrile-styrene-acrylate (ASA) polymers), polyofefins, and polyamides to produce compositions which exhibit good heat and ultraviolet light resistance. Such polymeric compositions can be used in manufacturing a wide variety of useful articles, such as profiles, moldings, sheeting, flooring, wall coverings, hose, cables, and footwear. Virtually any type of polyamide (nylon) can be utilized in preparing such blends. These nylons are generally prepared by reacting diamines with dicarboxylic acids. The diamines and dicarboxylic acids which are utilized in preparing such nylons will generally contain from about 2 to about 12 carbon atoms. However, nylons which can be utilized in such blends can also be prepared by addition polymerization. Some representative examples of nylons which can be used include nylon-6,6, nylon-6, nylon-7, nylon-8, nylon-9, nylon-10, nylon-11, nylon-12 and nylon-6,12. These nylons will typically have a number average molecular weight which is within the range of about 8,000 to about 40,000 and will more typically have a number average molecular weight which is within the range of about 10,000 to about 25,000. Some representative examples of polyolefins which can be used include linear low density polyethylene, high density polyethylene, polypropylene, polybutylene, and modified polyolefins, such as poly (ethylene vinylacetate) which is known as EVA.

This invention is illustrated by the following examples which are merely for the purpose of illustration and are not to be regarded as limiting the scope of this invention or the manner in which it can be practiced. Unless specifically indicated otherwise, all parts and percentages are given by weight.

EXAMPLE 1

In this experiment a rubbery polymer was made utilizing the techniques of this invention. The polymerization was conducted in a reactor having a capacity of 100 liters. The reactor was equipped with an axially flow turbine agitator which was operated at 110 rpm (revolutions per minute).

The reactor was charged with 74.6 kg (kilograms) of water, 0.92 kg of a half ester maleate soap (made with $C_{16}$ fatty alcohol), 0.31 kg of a 50 percent aqueous potassium hydroxide solution, 0.062 kg of sodium dodecylbenzene sulfonate, 18.0 kg of n-butylacrylate, 2.6 kg of acrylonitrile, 5.1 kg of methylacrylate, 0.38 kg of 1,4-butane diol dimethacrylate, 0.078 kg of t-dodecylmercaptan, and 0.058 kg of potassium persulfate. A temperature of about 60° C. was maintained throughout the polymerization. When a total solids content of about 25 percent was achieved, 0.025 kg of additional potassium persulfate was added. This first stage of the polymerization was carried out for a period of about 2½ hours. This first stage polymerization resulted in the production of a seed polymer latex which was used in the second step of the polymerization.

In the second step of the polymerization, 1.47 kg of acrylonitrile, 3.4 kg of styrene, 0.050 kg of divinylbenzene, and 0.009 kg of t-dodecylmercaptan were charged into the reactor containing the seed polymer latex. The polymerization proceeded until a solids content of about 30 percent was attained. The latex produced was white in color, had a pH of about 6.5, had a Brookfield viscosity of about 6 centipoise (CPS), a surface tension of about 49 dyne per centimeter, and a particle size of about 80 nanometers. However, the latex had a residual acrylonitrile concentration of about 1480 ppm (parts per million), a residual n-butylacrylate concentration of about 325 ppm, and had a strong odor. Residual monomer levels were determined by gas chromatography.

The latex made was subsequently coagulated and a dry rubber was recovered. The dry rubber was determined by gas chromatography to contain 24 ppm of residual acrylonitrile and 300 ppm of n-butylacrylate. The dry rubber had an undesirable odor.

The rubbery polymer made was also tested for fogging characteristics. In the procedure used the condensate from a 10 gram sample maintained at 100° C. was captured for 16 hours on a cooled aluminum foil which was supported on a glass plate. After the 16 hour period it was determined gravimetrically that about 4 mg of condensate had formed.

EXAMPLE 2

In this experiment a leathery composition was made by blending the rubbery polymer synthesized in Example 1 into PVC resin. This blend was prepared by blending 35 parts of ABS resin, 80 parts of the rubbery polymer, 25 parts of a plasticizer, 1.5 parts of antidegradants, and 4.5 parts of a red color dispersion stabilizer into 100 parts of the PVC resin.

An oil heated Farrel 8 inch (20.3 cm) plastics mill operated at 176° C. (349° F.) was used for the compound preparation. All powders, liquids, and stabilizers were first blended in a Hobart mixer to form a rough dry blend. The dry blend and elastomer were banded on the mill and mixed for 15 minutes before sheeting out at 0.040±5 gauge. Testing was conducted on milled sheet specimens.

The leathery composition prepared was determined to have physical characteristics which made it highly suitable for utilization in making skin compounds for panels used in automotive applications. The tensile strength, elongation to break, 100 percent modulus and Shore D hardness of the leathery composition made is reported in Table I (Example 2). The leather composition was also evaluated to determine its heat and ultraviolet light stability. The light aging studies were conducted in a Q-U-V accelerated weathering tester which was equipped with a UVB-313 lamp. One aging cycle consisted of 6 hours of light and 4 hours of 100 percent humidity at 65° C. with continuous repeated cycles to the total hours reported in Table I. The samples were 1 inch (2.54 cm)×3 inches (7.62 cm) in size.

Heat aging was conducted by the ASTM 573-78 air oven heat aging method with ASTM die C specimens. Tensile properties were determined before and after aging with a United Model FM30-DM1VA tensile tester at 20 inches per minute (50.8 cm/minutes) crosshead speed, 2.5 inch (6.35 cm) jaw separation, and 1 inch (2.54 cm) benchmark.

COMPARATIVE EXAMPLES 3–4

In this experiment, conventional skin compounds were prepared for comparative purposes. In these experiments, the same procedure as was described in Example 2 was employed, except for the fact that an ASA resin was substituted for the rubbery polymer utilized in Example 2. These ASA resins were terpolymers of acrylonitrile, styrene, and an acrylate monomer. In Comparative Example 3, the ASA resin used was Mobay Baymod™ KU3-2069A ASA resin with Baymod™ KU3-2079A ASA resin being utilized in Comparative Example 4.

The physical properties of these conventional skin compounds and their heat and ultraviolet light resistance characteristics are compared to those of the leathery compositions of this invention in Table I.

COMPARATIVE EXAMPLE 5

In this experiment an additional skin compound was prepared using the same procedure as was described in Example 2 except for the fact that a crosslinked nitrile rubber was substituted for the rubbery polymer utilized in Example 2 and except for the fact that the amount of ABS resin employed was increased to 60 parts. The physical properties of the conventional skin compound prepared in this experiment and its heat and ultraviolet light resistance characteristics are compared to those of the leathery compositions of this invention in Table I.

TABLE I

| COMPOUND | Ex. 2 | Ex. 3 | Ex. 4 | Ex. 5 |
| --- | --- | --- | --- | --- |
| Tensile, MPa | 17.4 | 21.7 | 22.8 | 20.2 |
| % Elongation | 125 | 197 | 116 | 296 |
| 100% Modulus, MPa | 17.2 | — | 22.6 | 16.9 |
| Shore D Hardness | 60 | 67 | 70 | 62 |

TABLE I-continued

| COMPOUND | Ex. 2 | Ex. 3 | Ex. 4 | Ex. 5 |
| --- | --- | --- | --- | --- |
| Air Oven Aged @ 100° C. % E Change | | | | |
| 504 Hours | 0 | −25.6 | −37 | −20 |
| 1008 Hours | −29 | −23.9 | −78 | −67 |
| 1512 Hours | −28 | −26.2 | −80 | −90 |
| 1992 Hours | −34 | −52 | −95 | |
| Air Oven Aged @ 121° C. % E Change | | | | |
| 70 Hours | 0 | 0 | −71 | −12 |
| 144 Hours | −3 | −9.4 | −79 | −10 |
| 288 Hours | −15 | −11 | −76 | −70 |
| 384 Hours | −20 | −11.1 | −75 | −94 |
| 480 Hours | −42 | −35.8 | −96 | −82 |
| 528 Hours | −44 | −37.6 | −98 | −95 |
| QUV 313 Light Aging Color Change | | | | |
| 70 Hours | 0.9 | 3.6 | 3.9 | 2.7 |
| 200 Hours | 7.9 | 8.5 | 7.1 | 9.0 |
| 360 Hours | 16.5 | 18.8 | 18.6 | 18.2 |
| 540 Hours | 16.5 | 19.1 | 21.5 | 20.9 |

As can be seen by reviewing the data in Table I, the physical properties of the leathery composition made with the rubbery polymer of this invention were very comparable to the standard skin compounds shown in Comparative Examples 3, 4 and 5. However, the skin compound made utilizing the rubbery polymer of this invention had greatly improved heat aged characteristics after 1,992 hours at 110° C. Its heat resistance 121° C. proved to be comparable to the heat stability displayed in Comparative Example 3. However, the skin compound made utilizing the rubbery polymer of this invention had greatly improved heat resistance at 121° C. as compared to the skin compound made in Comparative Example 4 and in Comparative Example 5. The leathery composition made in Example 2 proved to be superior to both of the standard skin compounds made in Comparative Examples 3, 4, and 5. Thus, the skin compounds of this invention display greater resistance to ultraviolet light than do conventional skin compounds made with ASA resins.

EXAMPLE 6

In this experiment a rubbery polymer was synthesized utilizing a procedure similar to the procedure employed in Example 1. This polymerization was conducted in a reactor having a capacity of 100 liters. The reactor was equipped with an axially flow turbine agitator which was operated at 110 rpm. The reactor was initially charged with 70.92 kg of water, 0.87 kg of dodecanol monomaleate, 0.40 kg of an aqueous 50% solution of potassium hydroxide, 0.06 kg of sodium dodecylbenzene sulfonate, 0.06 kg of sodium pyrophosphate, 0.05 kg of triethanol amine, 22.13 kg of n-butyl acrylate, 2.60 kg of acrylonitrile, 1.30 kg of methyl methacrylate, 0.65 kg of 1,4-butanediol dimethacrylate, 0.08 kg of t-docecylmercaptan, and 1.56 kg of a 5% solution of potassium persulfate. A temperature of about 35° C. was maintained throughout the polymerization. When a total solids content of about 24 percent was achieved, 0.52 kg of additional potassium persulfate solution was added. This first stage of the polymerization was carried out for a period of about 2½ hours. This first stage polymerization resulted in the production of a seed polymer latex which was used in the second step of the polymerization.

In the second step of the polymerization, 1.49 kg of acrylonitrile, 3.47 kg of styrene, 0.050 kg of divinylbenzene, and 9.3 mg of t-dodecylmercaptan were charged into the reactor containing the seed polymer latex. The polymerization temperature was then raised to 70° C. and the polymerization was allowed to continue. After the polymerization was completed, the latex made was coagulated and a dry rubber was recovered.

EXAMPLE 7

In this experiment a rubbery polymer was made in a 2 liter glass reactor utilizing the technique of this invention. In the procedure employed 1126 g of water, 5.93 g of a 50% aqueous potassium hydroxide solution, 14.0 g of hexadecyl monomaleate, 1.0 g of a 30% solution of sodium dodecylbenzene sulfonate, 1.0 g of sodium pyrophosphate, 231 g of n-butyl acrylate, 105 g of acrylonitrile, 42 g of 2-ethylhexylacrylate, 42 g of methyl acrylate, 8.4 g of 1,4-butanediol dimethacrylate, 0.84 g of t-dodecylmethacrylate, 8.3 g of a 5% aqueous solution of triethanol amine, and 24.9 g of a 5% aqueous solution of potassium persulfate were initially charged into the reactor. A temperature of about 35° C. was maintained during the first stage of the polymerization. When a solids content of about 20% was reached the reaction temperature was increased to about 60° C. and 24 g of additional acrylonitrile, 56 g of styrene, 0.96 g of divinylbenzene, and 0.16 g of t-dodecylmercaptan were charged into the reactor. After the polymerization was completed, the latex made was coagulated and a rubber was recovered.

EXAMPLE 8

In this experiment a rubbery polymer was made in a 2 liter glass reactor utilizing the technique of this invention. In the procedure employed 1126 g of water, 5.93 g of a 50% aqueous potassium hydroxide solution, 14.0 g of hexadecyl monomaleate, 1.0 g of a 30% solution of sodium dodecylbenzene sulfonate, 1.0 g of sodium pyrophosphate, 168 g of n-butyl acrylate, 105 g of acrylonitrile, 105 g of 2-ethylhexylacrylate, 42 g of methyl acrylate, 6.3 g of 1,4-butanediol dimethacrylate, 0.44 g of t-dodecylmethacrylate, 8.3 g of a 5% aqueous solution of triethanol amine, and 24.9 g of a 5% aqueous solution of potassium persulfate were initially charged into the reactor. A temperature of about 35° C. was maintained during the first stage of the polymerization. When a solids content of about 20% was reached the reaction temperature was increased to about 60° C. and 24 g of additional acrylonitrile, 56 g of styrene, 0.96 g of divinylbenzene, and 0.16 g of t-dodecylmercaptan were charged into the reactor. After the polymerization was completed, the latex made was coagulated and a rubber was recovered.

EXAMPLES 9–12

In this series of experiments leathery compositions were made be blending the rubbery polymers made in Examples 1, 6, 7, and 8 into PVC. In the procedure used 40 parts of the rubbery polymer was blended into 100 parts of the PVC. The blends made also included 50 parts of DOP and 3 parts of Ba/Zn. The blends were made by mixing the components in a mill at 180° C. for 6 minutes and then pressing them into samples at 180° C. The samples made were then tested to determine their physical properties.

The physical properties of the samples made are reported in Table II. The blend made in Example 9 contained the rubber composition of Example 1, the blend of Example 10 contained the rubber composition of Example 6, the blend of Example 11 contained the rubber composition of Example 7, and the blend of Example 12 contained the rubber composition of Example 8.

TABLE II

| Example | Shore A Hardness | Tensile Strength | Elongation | Modulus 50% (MPa) | 100% (MPa) |
| --- | --- | --- | --- | --- | --- |
| 9 | 80 | 17.0 MPA | 275% | 5.8 | 9.0 |
| 10 | 80 | 16.4 MPA | 258% | 5.7 | 8.8 |
| 11 | 80 | 15.5 MPA | 270% | 5.2 | 7.8 |
| 12 | 80 | 16.3 MPA | 260% | 6.1 | 9.4 |

As can be seen from Table II, all of the rubbery polymers made in Examples 1, 6, 7, and 8 could be made into leathery compositions which had good physical properties. In fact, the leathery compositions made exhibited as excellent combination of properties for utilization in making skins for use in automotive interior panels, such as crash pads.

EXAMPLE 13

In this experiment the latex made in Example 1 was deodorized before being coagulated. This was accomplished by adding 0.5 weight percent (based upon the total weight of the latex) of ethanolamine to the latex at room temperature (about 22° C.). After one day the level of residual acrylonitrile dropped from 1480 ppm to 51 ppm and the level of residual n-butylacrylate dropped from 325 ppm to 30 ppm. After three days the level of residual n-butylacrylate became undetectable.

The deodorized latex was subsequently coagulated and a dry rubber was recovered. Residual levels of acrylonitrile and n-butylacrylate were too low to be detectible by gas chromatography in the dry rubber. The dry rubber recovered did not have an undesirable odor.

EXAMPLE 14

In this experiment the procedure described in Example 1 was repeated except that the 0.92 kg of half ester maleate soap was replaced with 0.612 kg of an aromatic formaldehyde condensation product soap. The procedure employed in this experiment also differed from the procedure described in Example 1 in that the level of sodium dodecyl benzene sulfonate was increased to 0.3 kg. The aromatic formaldehyde condensation product soap utilized in this experiment was the sodium salt of the condensation product of naphthalene sulfonic acid and formaldehyde. It had a molecular weight which was within the range of about 1000 to about 5000 and can be represented by the structural formula:

The rubbery polymer made was then tested for fogging characteristics. In the procedure used the condensate from a 10 gram sample maintained at 100° C. was captured for 16 hours on a cooled aluminum foil which was supported on a glass plate. After the 16 hour period it was determined gravimetrically that 0.3 mg of condensate had formed. Thus, the fogging characteristics of the rubbery polymer made in this experiment were much better than the fogging characteristics of the rubbery polymer synthesized in Example 1 where 4.0 mg of condensate were collected in the fogging test. In other words, the rubbery polymer made in this experiment generated less that 10% of the amount of fog generated with the rubbery polymer of Example 1.

EXAMPLE 15

In this experiment the procedure described in Example 1 was repeated except that the 0.92 kg of half ester maleate soap was replaced with 0.765 kg of an Sokalan polycarboxylate soap. The procedure employed in this experiment also differed from the procedure described in Example 1 in that the level of sodium dodecyl benzene sulfonate was increased to 0.306 kg.

The rubbery polymer made was then tested for fogging characteristics. In the procedure used the condensate from a 10 gram sample maintained at 100° C. was captured for 16 hours on a cooled aluminum foil which was supported on a glass plate. After the 16 hour period it was determined gravimetrically that 0.4 mg of condensate had formed. Thus, the fogging characteristics of the rubbery polymer made in this experiment were much better than the fogging characteristics of the rubbery polymer synthesized in Example 1.

COMPARATIVE EXAMPLE 16

In this experiment the procedure described in Example 1 was repeated except that the 0.92 kg of half ester maleate soap was replaced with 0.612 kg of Dowfax 2A1 didodecyl diphenyloxide disulfonate soap. The rubbery polymer made was tested for fogging characteristics. In the procedure used the condensate from a 10 gram sample maintained at 100° C. was captured for 16 hours on a cooled aluminum foil which was supported on a glass plate. After the 16 hour period it was determined gravimetrically that 1.2 mg to 2.0 mg of condensate had formed. Thus, the fogging characteristics of the rubbery polymer made in this experiment were somewhat better than the fogging characteristics of the rubbery polymer synthesized in Example 1, but inferior to the results attained in Examples 14 and 15.

While certain representative embodiments and details have been shown for the purpose of illustrating the subject invention, it will be apparent to those skilled in this art that various changes and modifications can be made therein without departing from the scope of the subject invention.

What is claimed is:

1. A leathery composition which is useful in automotive applications which is comprised of (1) polyvinyl chloride, (2) a plasticizer, and (3) a rubbery polymer which is comprised of repeat units which are comprised of (a) butyl acrylate, or optionally a mixture of butyl acrylate and 2-ethylhexyl acrylate containing up to 40 weight percent 2-ethylhexyl acrylate, (b) at least one member selected from the group consisting of methyl methacrylate, ethyl methacrylate, methyl acrylate, and ethyl acrylate, (c) acrylonitrile, (d) styrene, (e) a surfactant selected form the group consisting of sulfonates and sulfate derivatives, (f) a dispersant selected from the group consisting of aromatic formaldehyde condensation products and polycarboxylates, and (g) a crosslinking agent.

2. A leathery composition as specified in claim 1 wherein said composition contains from about 40 to about 160 parts by weight of the rubbery polymer, from about 10 to about 50 parts by weight of the plasticizer, and from about 0.1 to about 5 parts by weight antidegradants.

3. A leathery composition as specified in claim 2 wherein said leathery composition is further comprised of about 15 to about 80 parts by weight of an acrylonitrile-butadiene-styrene resin per 100 parts of the polyvinylchloride.

4. A leathery composition as specified in claim 3 wherein the rubbery polymer is comprised of repeat units which are derived from about 40 to about 80 weight percent butylacrylate, from about 5 to about 35 weight percent of a member selected from the group consisting of methyl methacrylate, ethyl methacrylate, methyl acrylate, and ethyl acrylate, from about 4 to about 30 weight percent acrylonitrile, from about 3 to about 25 weight percent styrene, and from about 0.25 to about 8 weight percent crosslinking agent.

5. A leathery composition as specified in claim 4 wherein the crosslinking agent is selected from the group consisting of difunctional acrylates, trifunctional acrylates, difunctional methacrylates, trifunctional methacrylates and divinylbenzene.

6. A leathery composition as specified in claim 5 wherein said leathery composition contains from about 60 to about 120 parts by weight of the rubbery polymer, from about 15 to about 40 parts by weight of the plasticizer, and from about 0.5 to 3 parts by weight antidegradants.

7. A leathery composition as specified in claim 6 wherein said leathery composition contains from about 25 to about 55 parts by weight of the acrylonitrile-butadiene-styrene resin per 100 parts by weight of polyvinylchloride.

8. A leathery composition as specified in claim 7 which is further comprised of a color imparting agent selected from the group consisting of colorants and pigments.

9. A leathery composition as specified in claim 3 wherein the rubbery polymer contains repeat units which are derived from about 50 to about 80 weight percent butylacrylate, or optionally a mixture of butyl acrylate and 2-ethylhexyl acrylate containing up to about 40% 2-ethylhexyl acrylate, from about 3 to about 25 weight percent of a member selected from the group consisting of methyl methacrylate, ethyl methacrylate, methyl acrylate and ethyl acrylate, from about 6 to about 25 weight percent acrylonitrile, from about 5 to about 18 weight percent styrene, and from about 0.5 to about 4 weight percent crosslinking agent.

10. A leathery composition as specified in claim 9 wherein said leathery composition contains from about 70 to about 90 weight percent of the rubbery polymer, from about 20 to about 30 weight percent plasticizer, from about 1 to 2 weight percent antidegradant and from about 30 to 40 weight percent acrylonitrile-butadiene-styrene resin, per 100 parts by weight of the polyvinylchloride.

11. A leathery composition as specified in claim 10 wherein the rubbery polymer is comprised of repeat units which are derived from 55 to about 75 weight percent butyl acrylate, or optionally a mixture of butyl acrylate and 2-ethylhexyl acrylate containing up to about 40% 2-ethylhexyl acrylate, from about 5 to about 20 weight percent methylmethacrylate, from about 10 to about 14 weight percent acrylonitrile, from about 8 to about 14 weight percent styrene, and from about 1 to about 3 weight percent crosslinking agent.

12. A leathery composition as specified in claim 11 wherein the crosslinking agent is one or more members selected from the group consisting of divinylbenzene and 1,4-butanediol dimethacrylate.

13. A low fogging rubbery polymer which can be blended with polyvinyl chloride to make leathery compositions having good heat and ultraviolet light resistance, said rubbery polymer being comprised of repeat units which are comprised of (a) butyl acrylate, (b) at least one member selected from the group consisting of methyl methacrylate, ethyl methacrylate, methyl acrylate, and ethyl acrylate, (c) acrylonitrile, (d) styrene, (e) a surfactant selected form the group consisting of sulfonates and sulfate styrene, (e) a surfactant selected form the group consisting of sulfonates and sulfate derivatives, (f) a dispersant selected from the group consisting of aromatic formaldehyde condensation products and polycarboxylates, and (g) a crosslinking agent.

14. A low fogging rubbery polymer as specified in claim 13 wherein 2-ethylhexyl acrylate is further polymerized in an amount up to 40 weight percent of the total amount of butyl acrylate and 2-ethylhexyl acrylate polymerized.

* * * * *